United States Patent
Jacobson et al.

(10) Patent No.: US 9,263,961 B2
(45) Date of Patent: Feb. 16, 2016

(54) WIDE INPUT DC/DC RESONANT CONVERTER TO CONTROL REACTIVE POWER

(71) Applicant: Raytheon Company, Waltham, MA (US)

(72) Inventors: Boris S. Jacobson, Westford, MA (US); Donald H. Desrosiers, Sudbury, MA (US)

(73) Assignee: RAYTHEON COMPANY, Waltham, MA (US)

( * ) Notice: Subject to any disclaimer, the term of this patent is extended or adjusted under 35 U.S.C. 154(b) by 99 days.

(21) Appl. No.: 13/948,662

(22) Filed: Jul. 23, 2013

(65) Prior Publication Data

US 2015/0029758 A1  Jan. 29, 2015

(51) Int. Cl.
- *H02M 3/335* (2006.01)
- *H02M 3/337* (2006.01)
- *H02M 1/00* (2007.01)
- *H02M 7/48* (2007.01)

(52) U.S. Cl.
CPC ........ *H02M 3/3376* (2013.01); *H02M 3/33576* (2013.01); *H02M 2001/0032* (2013.01); *H02M 2007/4815* (2013.01)

(58) Field of Classification Search
CPC ............ H02M 3/335; H02M 3/33569; H02M 3/33576
USPC ............. 363/21.02, 21.03, 17, 15, 16, 95, 98, 363/40, 41, 97, 132
See application file for complete search history.

(56) References Cited

U.S. PATENT DOCUMENTS

| | | | |
|---|---|---|---|
| 791,423 | A | 5/1905 | Hilder |
| 1,390,050 | A | 9/1921 | Lee |
| 1,662,132 | A | 3/1928 | Simmons |
| 2,387,327 | A | 10/1945 | Holslag |
| 2,617,090 | A | 11/1952 | Ogle |
| 3,599,037 | A | 8/1971 | Grace |
| 3,657,678 | A | 4/1972 | Schwenden |
| 4,691,270 | A | 9/1987 | Pruitt |
| 4,855,888 | A | 8/1989 | Henze et al. |
| 4,876,635 | A | 10/1989 | Park et al. |
| 4,987,390 | A | 1/1991 | Mouri et al. |
| 5,426,409 | A | 6/1995 | Johnson |

(Continued)

OTHER PUBLICATIONS

Alonso et al., "Investigation of a New Control Strategy for Electronic Ballasts Based on Variable Inductor," IEEE Transactions on Industrial Electronics, vol. 55, No. 1, Jan. 2008, pp. 3-10.

(Continued)

*Primary Examiner* — Matthew Nguyen
(74) *Attorney, Agent, or Firm* — Cantor Colburn LLP

(57) ABSTRACT

A DC/DC resonant converter system includes a primary converter unit having a split resonant tank circuit. The resonant converter unit further includes a plurality of primary switching units that control the current flowing into the split resonant tank circuit. A controlled secondary rectifier unit includes a plurality of rectifier switching units to reduce reactive power in the primary converter unit. A phase-shift controller is in electrical communication with the primary converter unit and the controlled secondary rectifier unit. The phase-shift controller is configured to determine a rectifier phase-shift angle based on the plurality of primary switching units and to control switching of the plurality of rectifier switching units based on the rectifier phase-shift angle.

12 Claims, 17 Drawing Sheets

(56) References Cited

U.S. PATENT DOCUMENTS

| | | | |
|---|---|---|---|
| 5,438,498 A * | 8/1995 | Ingemi | 363/17 |
| 5,481,238 A | 1/1996 | Carsten et al. | |
| 5,500,791 A * | 3/1996 | Kheraluwala et al. | 363/17 |
| 5,559,688 A | 9/1996 | Pringle | |
| 5,629,553 A | 5/1997 | Ikeda et al. | |
| 5,784,692 A | 7/1998 | Kleinberg | |
| 6,348,848 B1 | 2/2002 | Herbert | |
| 6,429,765 B1 | 8/2002 | Valdemarsson et al. | |
| 6,843,138 B2 | 1/2005 | Pollard | |
| 6,873,138 B2 | 3/2005 | Jacobson | |
| 6,927,660 B2 | 8/2005 | Okamoto | |
| 7,187,263 B2 | 3/2007 | Vinciarelli | |
| 7,391,202 B2 | 6/2008 | Brandt et al. | |
| 7,839,023 B2 | 11/2010 | Jacobson et al. | |
| 2003/0198067 A1 | 10/2003 | Sun et al. | |
| 2005/0024179 A1 | 2/2005 | Chandrasekaran et al. | |
| 2011/0194206 A1* | 8/2011 | Sase et al. | 360/75 |
| 2012/0194313 A1 | 8/2012 | Wohlforth | |
| 2014/0009968 A1* | 1/2014 | Matsuura et al. | 363/17 |

OTHER PUBLICATIONS

Bakan, "A New LVI Assisted PSPWM DC-DC Converter," International Conference on Electrical and Electronics Engineering, 2009, ELECO 2009, pp. I-230 to I-233 (4 pages).

Ben Yaakov et al., "A Self-Adjusting Sinusoidal Power Source Suitable for Driving Capacitive Loads," IEEE Transactions on Power Electronics, vol. 21, No. 4, Jul. 2006, pp. 890-898.

Canales, et al., "A Wide Input Voltage and Load Output Variations Fixed-Frequency ZVS DC/DC LLC Resonant Converter for High-Power Applications", IEEE 37th IAS Annual Meeting Conference Record, vol. 4, 2002, pp. 2306-2313.

Corradini et al., "Zero Voltage Switching Technique for Bi-Directional DC/DC Converters", Energy Conversion Congress and Exposition (ECCE), 2011 IEEE; Issue Date: Sep. 17-22, 2011, pp. 2215-2222.

Doncker et al., "The Auxiliary Resonant Commutated Pole Converter", IAS, 1990 IEEE; pp. 1228-1235.

Gallagher, "Coupled Inductors Improve Multiphase Buck Efficiency," Power Electronics Technology, Jan. 2006, pp. 36-42.

J. Gallagher, "Designing Coupled Inductors," Power Electronics Technology, Apr. 2006, pp. 14-21.

Jacobson et al., "Series Resonant Converter with Clamped Tank Capacitor Voltage", 1990 IEEE APEC, pp. 137-146.

Boris S. Jacobson, et al., "Multiphase Power Converters Involving Controllable Inductors," U.S. Appl. No. 13/416,368, filed Mar. 9, 2012.

U.S. Appl. No. 13/416,368; Non-Final Office Action; Date Filed: Mar. 9, 2012; Date Mailed: Mar. 19, 2013; pp. 1-15.

Wong et al., "A Novel Modeling Concept for Multi-Coupling Core Structures," IEEE APEC 2001, Mar. 4-8, 2001, pp. 102-108.

U.S. Appl. No. 13/416,368; Non-Final Office Action; Date Filed: Mar. 9, 2012; Date Mailed: Sep. 20, 2013; pp. 1-17.

* cited by examiner

WIDE INPUT DC/DC RESONANT CONVERTER TO CONTROL REACTIVE POWER

BACKGROUND

The present disclosure relates generally to DC/DC resonant converters, and more specifically, a wide input DC/DC resonant converter that limits reactive power.

Conventional DC/DC switched-mode power converters, and in particular resonant converters, often use phase-shift modulation (PSM) control that reduce switching losses and noise by operating in a Zero-Voltage Switching (ZVS) mode. The ZVS mode may be utilized with a high switching frequency to provide a compact and low-loss power converter. During light load conditions the ZVS mode becomes ineffective, and in high input line conditions excessive reactive power occurs.

A conventional method of improving ZVS during light load conditions is to introduce an additional inductive current, i.e., a lagging current source, into the converter nodes coupled to the switching transistors. The lagging current source extends the range of low-loss switching to light loads, but often compromises efficiency at mid-range and full loads. For example, conventional series resonant converter (SRC) topologies are designed to deliver the full rated power at the lowest input voltage. However, the power stored in the resonant tank at any given half-cycle interval is proportional to the square of the input voltage. Consequently, in full-load conditions, any increase of the input voltage generates both reactive power and circulating currents that reduces efficiency at high input voltages.

SUMMARY

A direct current to direct current (DC/DC) resonant converter system includes a primary converter unit having a split resonant tank circuit. The resonant converter unit further includes a plurality of primary switching units that regulates the current flowing into the split resonant tank circuit. A controlled secondary rectifier unit includes a plurality of rectifier switching units to reduce reactive power in the primary converter unit. A phase-shift controller is in electrical communication with the primary converter unit and the controlled secondary rectifier unit. The phase-shift controller is configured to determine a rectifier phase-shift angle based on the plurality of primary switching units and to control switching of the plurality of rectifier switching units based on the rectifier phase-shift angle.

According to another embodiment, a method of controlling a resonant power in a DC/DC converter comprises determining transfer coefficients of the DC/DC converter, and determining an input voltage of the DC/DC converter. The method further includes determining at least one of an output voltage and an output current of the DC/DC converter, and generating an initial phase-shift angle based on the input voltage and the transfer coefficients. The method further includes generating a related phase-shift angle based on at least one of the output voltage and the output current, and a threshold value. The method further includes adjusting the related phase-shift angle based on a comparison between one of the output voltage and a reference voltage, or the output current and a reference current.

In still another embodiment, a method of controlling a resonant power in a DC/DC converter comprises determining transfer coefficients of the DC/DC converter, and determining an input voltage of the DC/DC converter. The method further includes determining at least one of an output voltage and an output current of the DC/DC converter. The method further includes generating an initial phase-shift angle of the resonant power in a DC/DC converter based on the input voltage and the transfer coefficients. The method further includes determining a plurality of zero-voltage switching (ZVS) feedback currents of the resonant power in a DC/DC converter. The method further includes adjusting the initial phase shift angle based on a comparison between each ZVS feedback current to a respective ZVS reference current.

DETAILED DESCRIPTION

Figure 1:
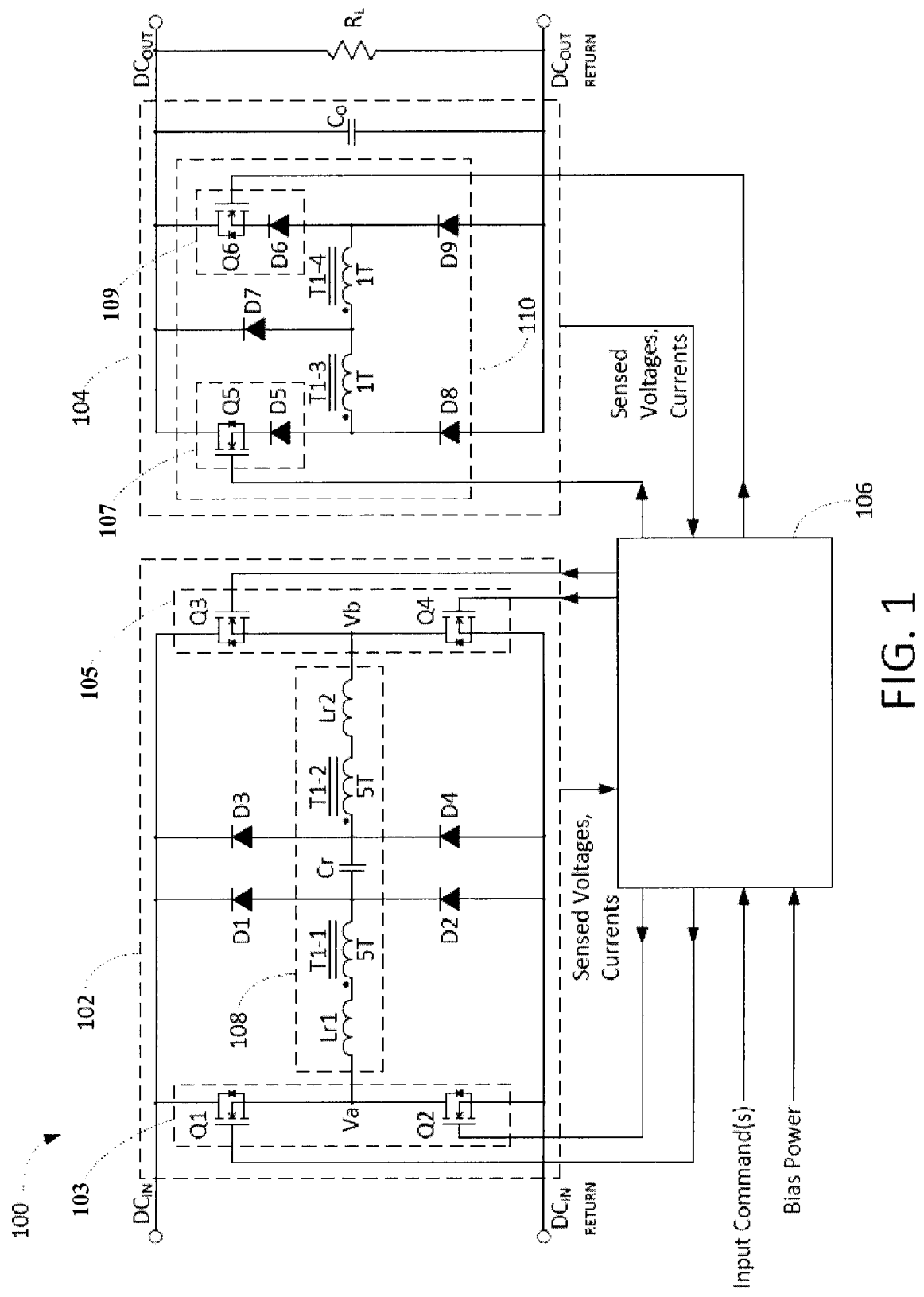
FIG. 1 is a block diagram illustrating a wide input DC/DC resonant converter system according to an embodiment of the disclosure utilizing MOSFETs as switching transistors.

Referring now to FIG. 1, a block diagram of a wide input DC/DC resonant converter system 100 is illustrated according to an embodiment of the disclosure. According to at least one embodiment, the DC/DC converter system utilizes a series resonant converter (SRC) topology and a controlled rectifier (CR) to form a SRC-CR system. The DC/DC resonant converter system 100 is configured to reduce reactive power at the high input line of the converter while providing zero voltage switching (ZVS) assistance currents that achieves low-loss switching across a wide range of loads (i.e., light load to full load) and a wide range of input voltages. For example, the input voltage may be a low input voltage of approximately 385 Vdc, a nominal input voltage of approximately 560 Vdc, or a high input voltage of approximately 720 Vdc. The loads may range from light loads of about 0 W (watts) to about 5 W consumed, to high loads of about 1000 W to about 5000 W consumed.

The wide input DC/DC resonant converter system 100 includes a primary converter unit 102, a controlled secondary rectifier unit, i.e., a controlled rectifier (CR) 104, and a phase-shift controller 106. The primary converter unit 102 includes a resonant tank circuit 108 and a plurality of primary switching units Q1-Q4. The resonant tank circuit 108 may include a split resonant tank circuit 108, as further illustrated in FIG. 1. The split resonant tank circuit 108 includes a resonant capacitor Cr interposed between a first half winding unit Lr1/T1-1 and a second half winding unit T1-2/Lr2. The first half and second half windings may have an inductance of approximately 2.5 microhenries (μH) for example.

The plurality of primary switching units (Q1-Q4) may be formed as semiconductor devices, such as a field effect transistor (FET), and may include a first set of FETs Q1,Q2, and a second set of FETs Q3, Q4 to form a primary H-bridge circuit. The first set of FETs Q1,Q2 form a first leg 103 of the primary H-bridge circuit, and the second set of FETs Q3, Q4 for a second leg 105 of the primary H-bridge circuit. One end of the first half winding unit Lr1/T1-1 may be connected to the source of FET Q1 and the drain of the FET Q2, while the opposite end of the first half winding unit Lr1/T1-1 may be connected to a first end of the resonant capacitor Cr. One end of the second half winding unit T1-2/Lr2 may be connected to the opposite end of the resonant capacitor Cr, while the opposite end of the second half winding unit T1-2/Lr2 may be connected to the source of FET Q3 and the drain of the FET Q4. Each vertical leg, i.e., segment, of the H-bridge is selectively controlled via a respective FET among the plurality of FETs (Q1-Q4). The primary converter unit 102 may further include a plurality of clamping diodes (D1-D4) to clamp the voltage realized across the resonant capacitor Cr. The resonant capacitor may have a capacitance of approximately 0.01 μf for example.

Figure 2:
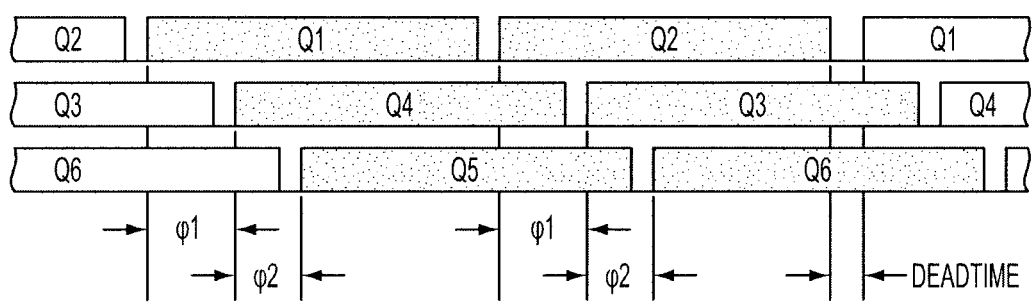
FIG. 2 is a diagram illustrating phase angles of the switching transistors included in a DC/DC resonant converter according to at least one embodiment.

The primary converter unit 102 operates according to a fixed frequency phase-shift modulation control. The primary FETs Q1,Q2 are alternately switched with approximately a 50% duty cycle leaving only a short time "dead time" interval, for example 60 nanoseconds (ns). The FETs may be switched at a low frequency of approximately 600 kHz, a nominal frequency of approximately 750 kHz, or a high frequency of approximately 900 kHz. Referring to FIG. 2, the FET Q4 is activated, i.e., turned on, with respect to FET Q1 by a first phase-shift angle φ1. The FET Q3 is delayed with respect to FET Q2 by the same phase-shift angle φ1. The duty cycle of voltage (Vr) applied to the diagonal of the H-bridge circuit 108 (i.e., Vr=Va−Vb) increases in response to decreasing the phase-shift angle φ1. Accordingly, modulation of the phase-shift angle φ1 results in pulse-width modulation (PWM) control of the output power. The output power (Po) may have a value, for example, of 3 kW.

The CR 104 includes a plurality of rectifier switching units Q5, Q6 to reduce reactive power in the primary converter unit 102. The rectifier switching units Q5, Q6 may be formed from semiconductor devices such as FETs. The CR 104 further includes a controlled bridge 110 including a third leg and a fourth leg. The third leg comprises a first bridge diode (D8), and a diode (D5) connected to rectifier switching unit Q5 to define a first unidirectional switching unit 107. The fourth leg comprises a second bridge diode (D9), and a diode (D6) connected to rectifier switching unit Q6 to define a second unidirectional switching unit 109. Each of the first and second unidirectional switches 107, 109 are configured to block the reverse voltage.

The controlled bridge 110 further includes a center-tapped secondary winding T1-3/T1-4 and a center-tap diode (D7). An end of the secondary winding T1-3 is connected between the first unidirectional switching unit 107 and the first bridge diode D8. An end of the secondary winding T1-4 is connected between the second unidirectional switching unit 109 and the second bridge diode D9. The center-tap diode D7 has an anode connected at the center of the secondary winding T1-3/T1-4, and a cathode commonly connected to the first and second switching units 107, 109. An output capacitor $C_o$ may be connected across the output of the CR 104 to filter noise from the output signal realized by the load ($R_L$). The load resistance may be, for example, approximately 1.2 ohms (Ω), and the output power may be, for example, approximately 3 kW.

Based on the structure of the controlled bridge 110 described above, the third leg 107 and the fourth leg 109 may over-ride current flowing through the center-tapped secondary winding T1-3/T1-4. For example, when the first and second unidirectional switches 107, 109 are deactivated, current flows through the center-tap diode D7. In response to activating at least one of the first and second unidirectional switches 107, 109, the effective primary impedance is increased, and current flowing through the center-tap diode D7 and the center-tapped secondary winding T1-3/T1-4 is reduced. The controlled bridge 110, therefore, provides a feature of adjusting the turn ratio of the center-tapped secondary winding T1-3/T1-4 to control the current flowing therethrough, thereby controlling the reactive power of the wide input DC/DC resonant converter system 100. In one example, the turns ratio may be adjusted to provide a 2:1 input voltage range, for example. The ratio, however, is not limited to exactly a 2:1 ratio and may include values ranging therebetween.

According to at least one embodiment of the wide input DC/DC resonant converter system 100, the CR 104 is controlled according to a second phase-shift angle φ2. The second phase-shift angle φ2 delays conduction of the rectifier FETs Q5 and Q6 with respect to the individual FETs Q4 and Q3 of the second leg 105. That is, the third leg of the controlled bridge 110, which comprises the first unidirectional switching unit 107, is phase-shifted with respect to Q3 of the second leg 105. The fourth leg of the controlled bridge 110, which comprises the second unidirectional switching unit 109, is phase shifted with respect to Q4 of the second leg 105.

In terms of the energy stored in the primary converter unit 102, quality factor ($Q_f$) of the resonant tank circuit 108 may be controlled on a cycle-by-cycle basis. For example, if the second phase-shift angle φ2=0, such that Q5 is in phase with Q3 and Q6 is in phase with Q3, the full secondary winding T1-3/T1-4, i.e., both the first half and second half of the secondary winding, is conducting and the quality factor is high, for example Q(n)=approximately 0.24. During the fraction of the cycle when the second phase-shift angle φ2 is greater than zero, one half of the secondary winding T1-3/T1-4 does not conduct and the quality factor is low, for example Q(2n)=approximately 0.06, and the power drawn from the input source is reduced. Increasing the second-phase shift angle φ2 proportionally to the input voltage reduces the reactive power circulating through the primary converter unit 102 at the high end of the input voltage range, for example approximately 720 Vdc. At the same time, even though a reduced reactive power is drawn from the input source, the primary converter unit 102 is capable of providing certain ZVS assistance currents to the primary FETs Q1-Q4. The operation of the wide input DC/DC resonant converter system 100 will be discussed in greater detail below.

The wide input DC/DC resonant converter system 100 also achieves a zero voltage switching-zero voltage current switching (ZVS-ZCS) switching method. More specifically, the wide input DC/DC resonant converter system 100 may be unidirectional, thereby inhibiting regenerative power. The primary converter unit 102 may operate according to ZVS, while the CR 104 operates with zero current switching (ZCS). Because voltage across secondary semiconductors has a high rate of change during switching transitions, losses caused by the discharge of switches' equivalent output capacitance will grow at high output voltages. Accordingly, applications corresponding to this topology may utilize an output voltage range of tens to low hundreds of volts, for example, unless switching units having low capacitance are used and the switching frequency is relatively low, for example, approximately 500 kHz.

Figure 3:
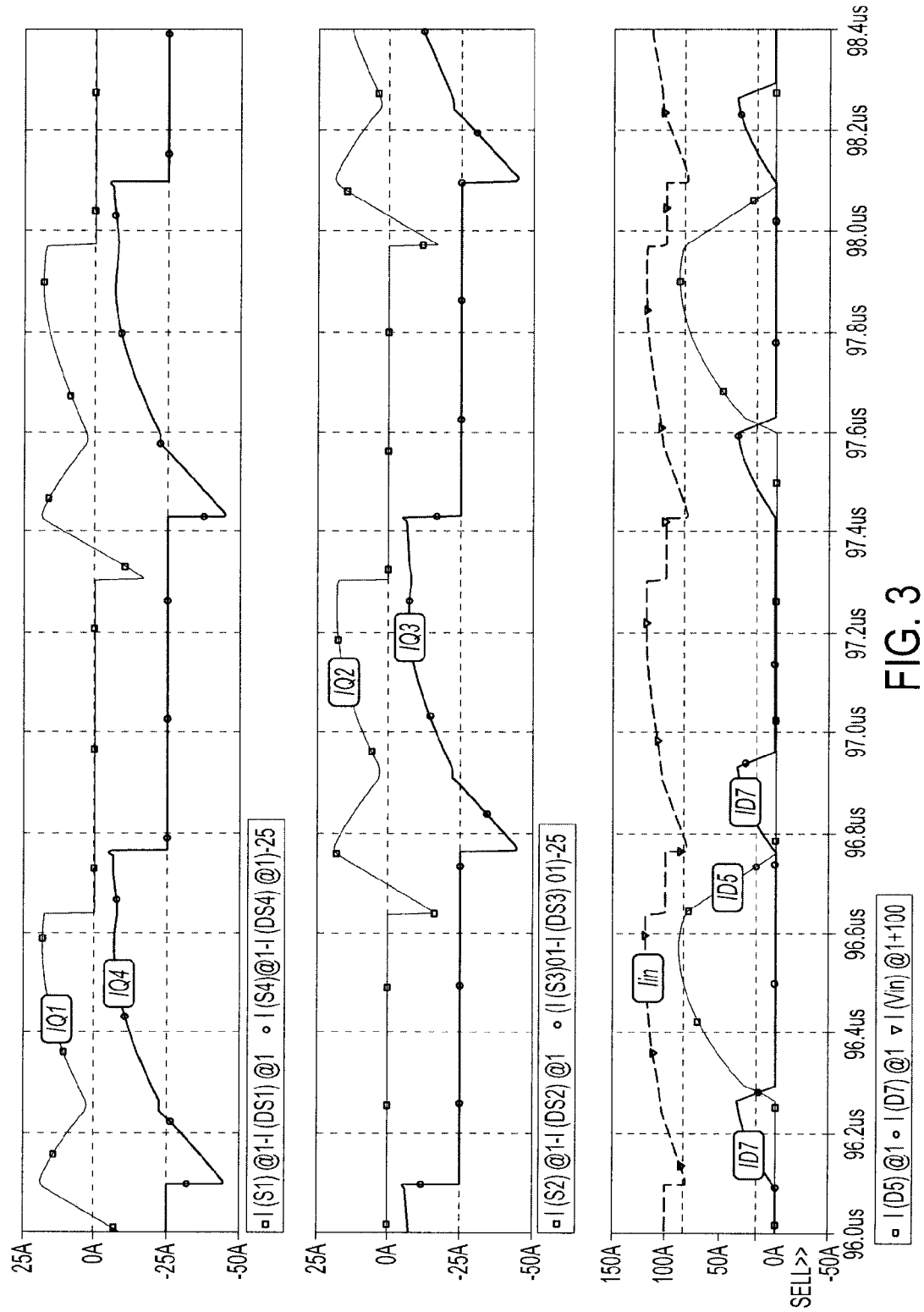
FIG. 3 is a diagram illustrating waveforms showing the operating behavior of the switching transistors included in a DC/DC resonant converter at full power according to at least one embodiment.
Figure 4:
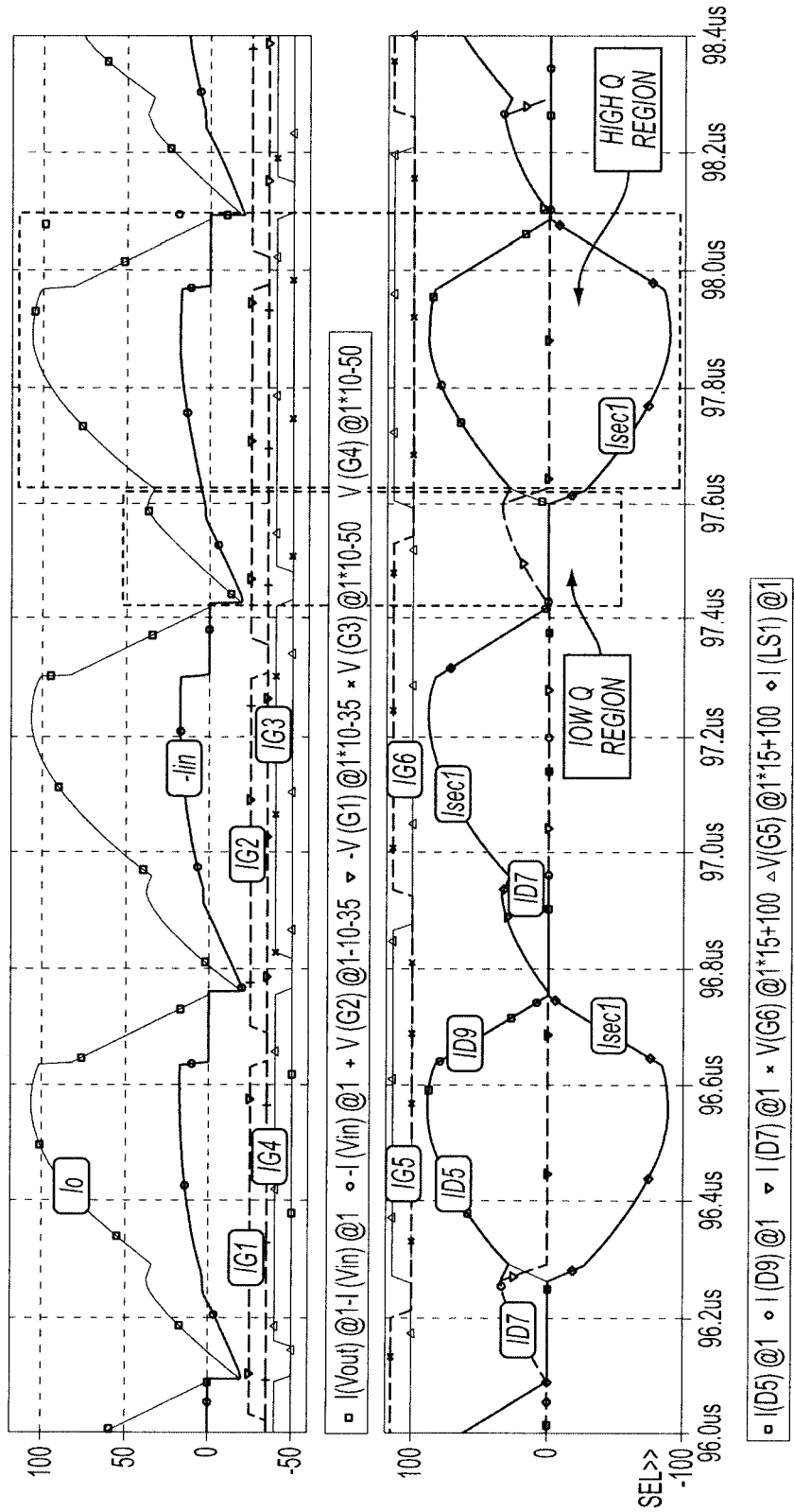
FIG. 4 is a diagram illustrating waveforms showing the operating regions of the switching transistors included in a DC/DC resonant converter at full power according to at least one embodiment.

Referring now to FIGS. 3 and 4, a diagram of waveforms showing the operating behavior and operating regions of the FETs included in the wide input DC/DC resonant converter system 100 operating at full power is illustrated according to at least one exemplary embodiment. Under nominal conditions, for example, an input voltage of approximately 560 VDC, a frequency of approximately 750 kHz and a full load of approximately 3 kW, primary FET Q4 of the second leg of the primary converter unit 102 is delayed with respect to primary FET Q1 of the first leg of the primary converter unit 102 by a first phase-shift angle φ1=34°. The primary FET Q3 of the second leg is delayed with respect to primary FET Q2 of the first leg by the same first phase-shift angle, i.e., φ1=34°. The rectifier FET Q5 of the third leg of the controlled bridge 110, however, is delayed with respect to the primary FET Q4 of the second leg by a second phase-shift angle φ2=30°. The rectifier FET Q6 of the fourth leg is also delayed with respect to the primary FET Q3 of the second leg by the same second-phase shift angle, i.e., φ2=30°. It can be seen by examining the input current ($I_{in}$) waveform that during the time interval corresponding to the sum of the first and second phase-shift angles (φ1+φ2), the power flows back to the input source. Also during the interval of D7 conduction, the primary converter unit 102 is coupled to the load with a reduced quality factor Q(2n)=0.06 because only one half of the secondary winding T1-3/T1-4 conducts current, as illustrated in FIG. 4. Operation with lower $Q_f$ produces lower output power and reduces the reactive power and circulating currents in the primary converter unit 102.

Figure 5:
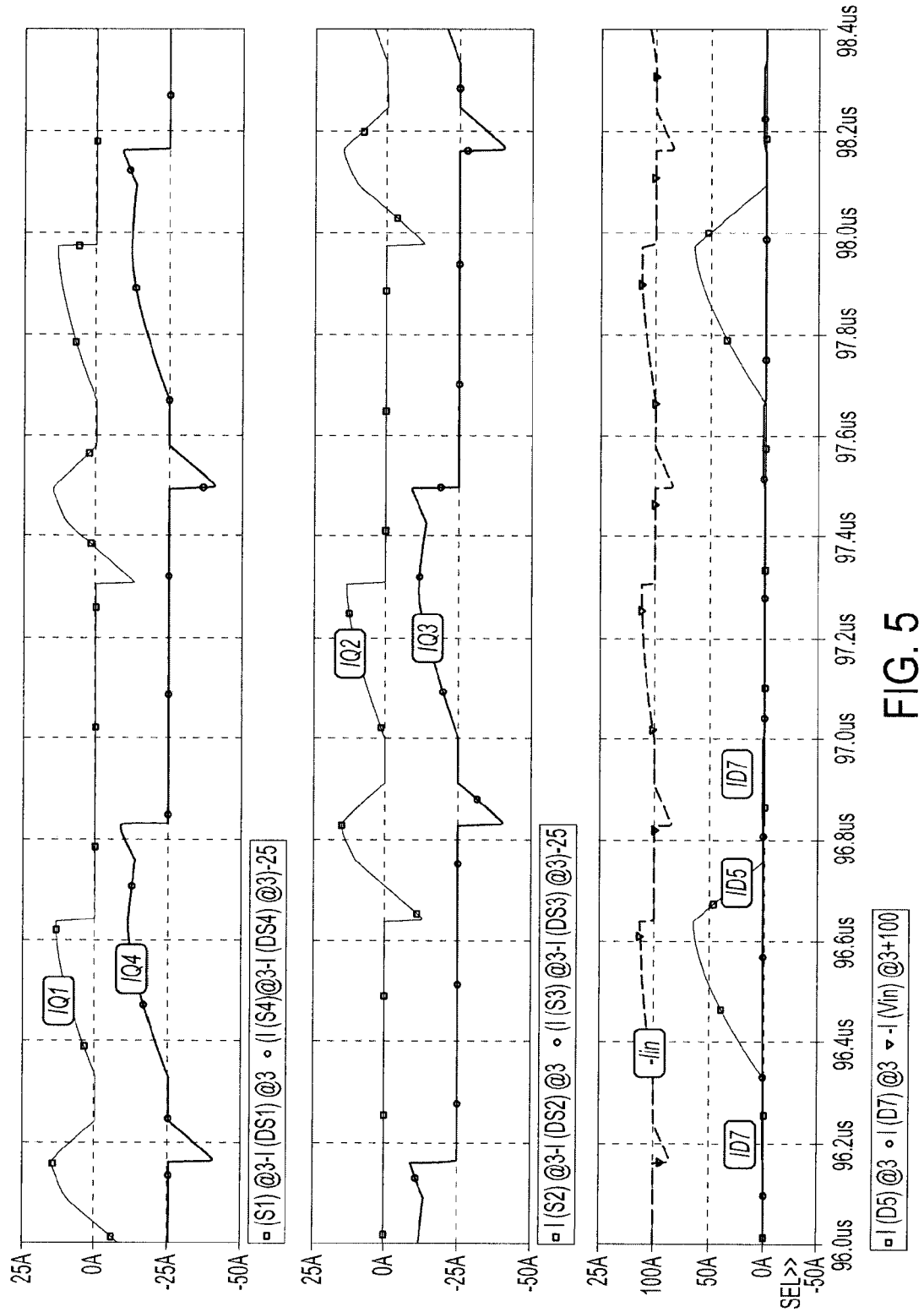
FIG. 5 is a diagram illustrating waveforms showing the operating behavior of the switching transistors included in a DC/DC resonant converter at half power according to at least one embodiment.
Figure 6:
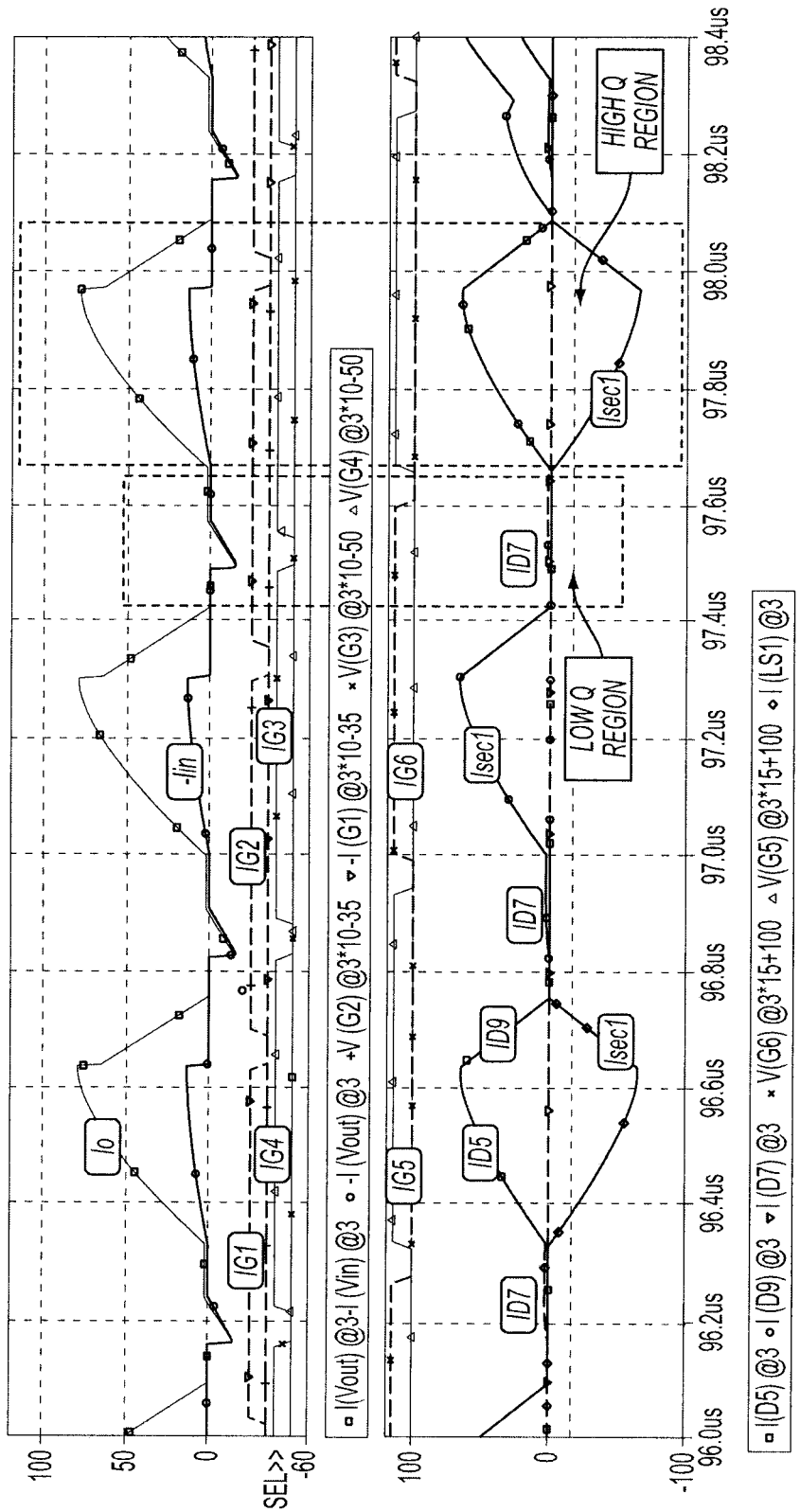
FIG. 6 is a diagram illustrating waveforms showing the operating regions of the switching transistors included in a DC/DC resonant converter at half power according to at least one embodiment.

Referring now to FIGS. 5 and 6, a diagram of waveforms showing the operating behavior and regions of the FETs included in the wide input DC/DC resonant converter system 100 at half power is illustrated according to at least one exemplary embodiment. The primary converter unit 102 operates according to the nominal input voltage (560 VDC) and nominal frequency (750 kHz) mentioned above. At half-load, i.e., 50% load of 1500 W, the first phase-shift angle φ1=51° and the second phase-shift angle φ2=30°. It has similar conduction patterns and waveforms, but with lower currents. The extended conduction interval for D7 corresponds to the longer time interval for the low Q region and the shorter time interval for the high Q region.

Figure 7:
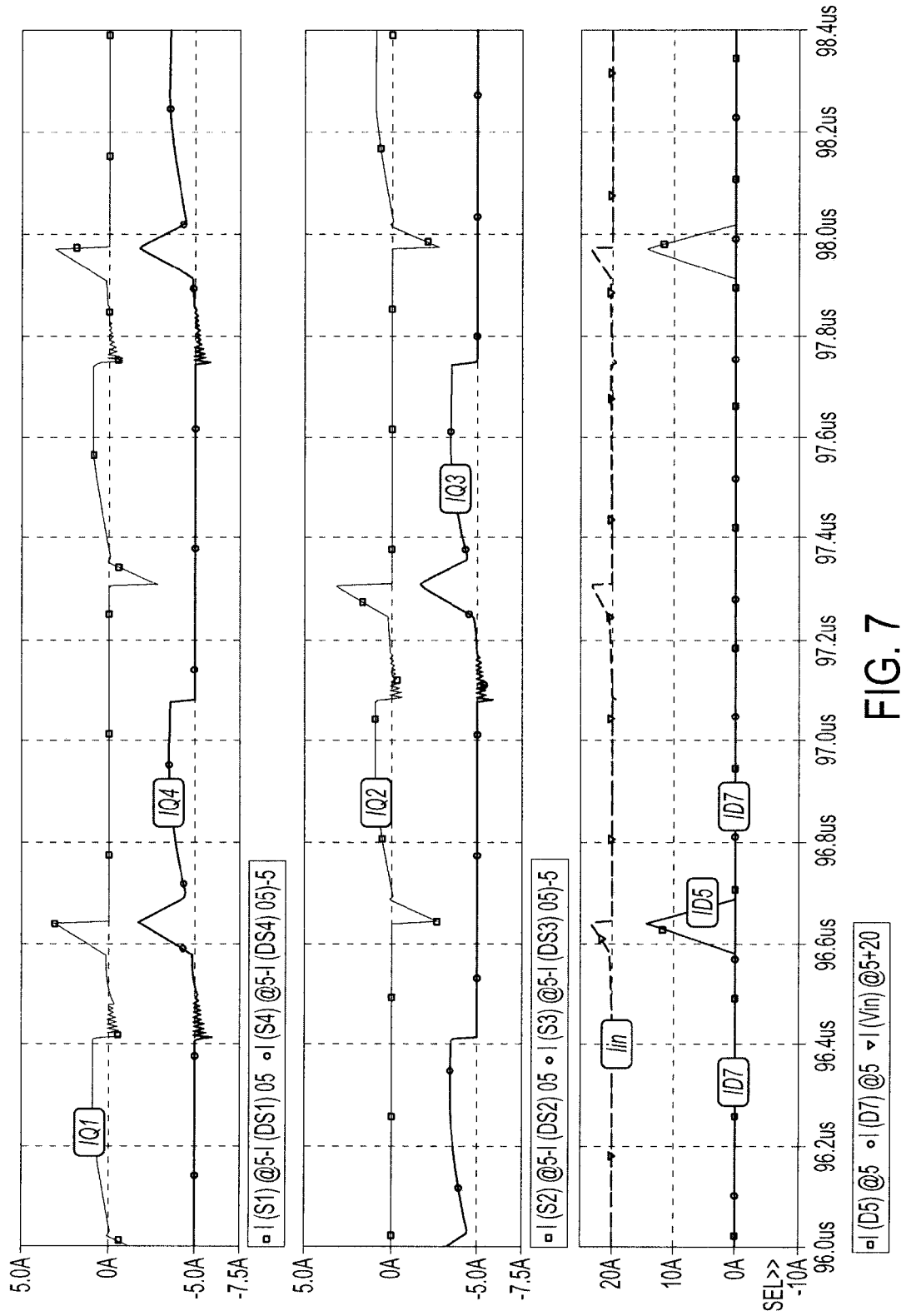
FIG. 7 is a diagram illustrating waveforms showing the operating behavior of the switching transistors included in a DC/DC resonant converter at low power according to at least one embodiment.
Figure 8:
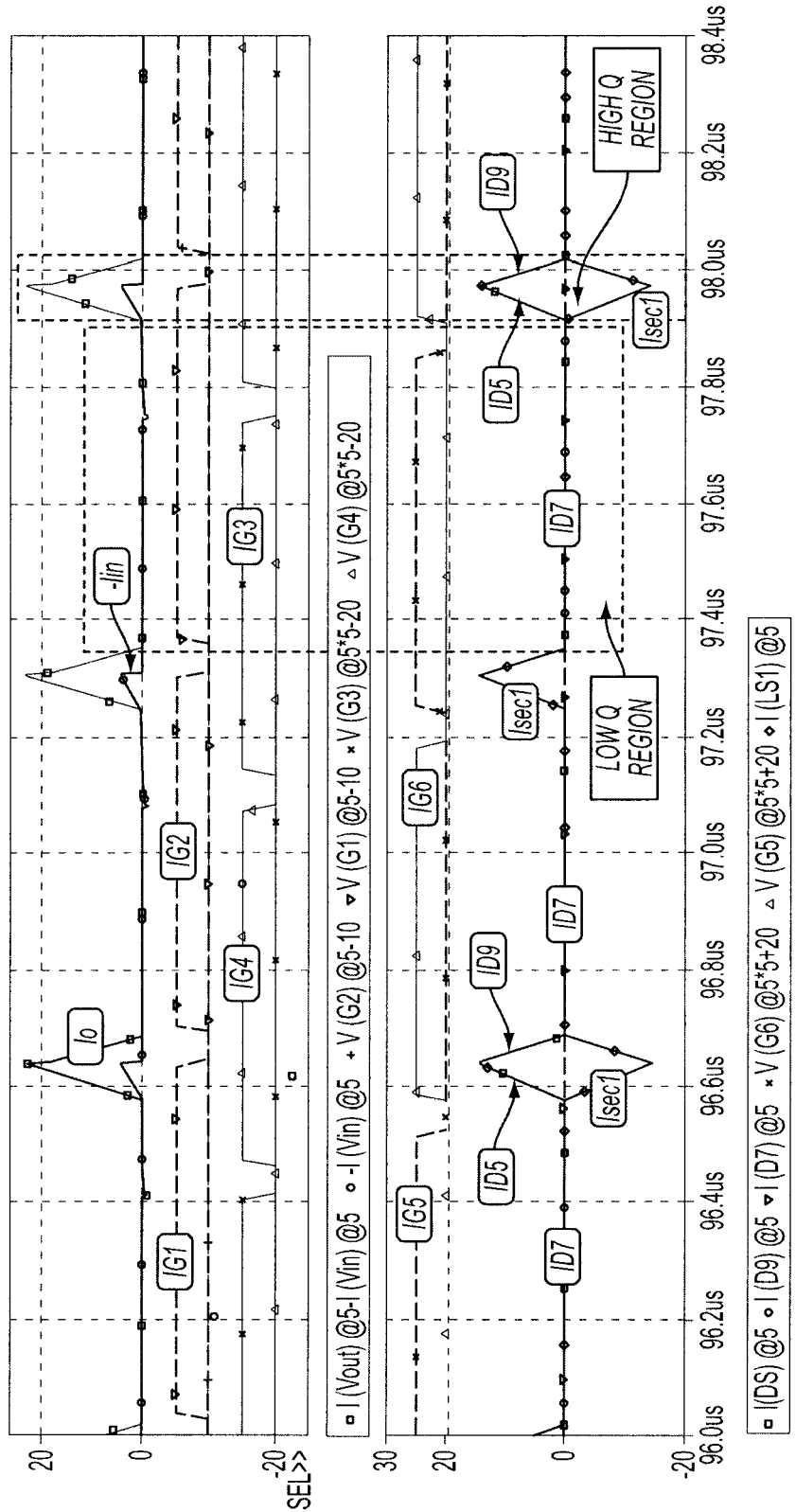
FIG. 8 is a diagram illustrating waveforms showing the operating regions of the switching transistors included in a DC/DC resonant converter at low power according to at least one embodiment.

Referring to FIGS. 7 and 8, a diagram of waveforms showing the operating behavior and operating regions of the FETs included in the wide range DC/DC resonant converter system 100 at low power is illustrated according to at least one embodiment. In this scenario, the wide range DC/DC resonant converter system 100 operates with a light load of 70 W (i.e., approximately 2.3% of the rated power) under the nominal input voltage (560 VDC) and nominal frequency (750 kHz). At light load, the first phase-shift angle φ1=118° and the second phase-shift angle φ2=30°, as further shown in FIGS. 7 and 8. Accordingly, the wide range DC/DC resonant converter system 100 achieves reduced currents. For clarity, the currents are scaled by a factor of ten as illustrated in FIGS. 7 and 8. The conduction interval of D7 is further extended leaving a small fraction of the cycle time for the high Q operation. Even at this light load, the primary FETs Q1-Q4 keep some negative current to maintain ZVS.

Referring again to FIG. 1, the phase-shift controller 106 may be in electrical communication with the primary converter unit 102 and the CR 104 to control the switching of the primary FETs (Q1-Q4) and the rectifier FETs (Q5 and Q6), respectively. The wide range DC/DC resonant converter system 100 may employ phase-shift modulation (PSM) to generate the first phase-shift angle φ1, which is applied to the primary FETs (Q1-Q4). The CR 104 may employ a feed-forward PSM derived from the input voltage to generate the second phase-shift angle φ2. For example, the second phase-shift angle φ2 may be generated according to the following algorithm:

$$0 < Vin \leq 400V \, \phi2 = 0 \quad (1)$$

$$400V < Vin \leq 720V \, \phi2 = A + k*Vin \quad (2)$$

$$\text{where } A = -75° \text{ and } k = 0.1875°/V \quad (3)$$

Accordingly, the second phase-shift angle lags, i.e., is delayed, with respect to the first phase-shift angle φ1. For example, applying the first and second phase-shift angles to the primary converter unit 102 and the CR 104, respectively, causes Q5 to lag behind Q4 by the second phase-shift angle φ2, and causes Q6 to lag behind Q3 by the same angle, i.e., the second phase-shift angle φ2. Although at least one embodiment of the 100 uses a piecewise linear feed-forward function of the input voltage to generate the second phase-shift angle φ2, other methods may be used including, but not limited to, an independent feedback loop. Operation of the phase-shift controller 106 is described in greater detail below.

Figure 9:
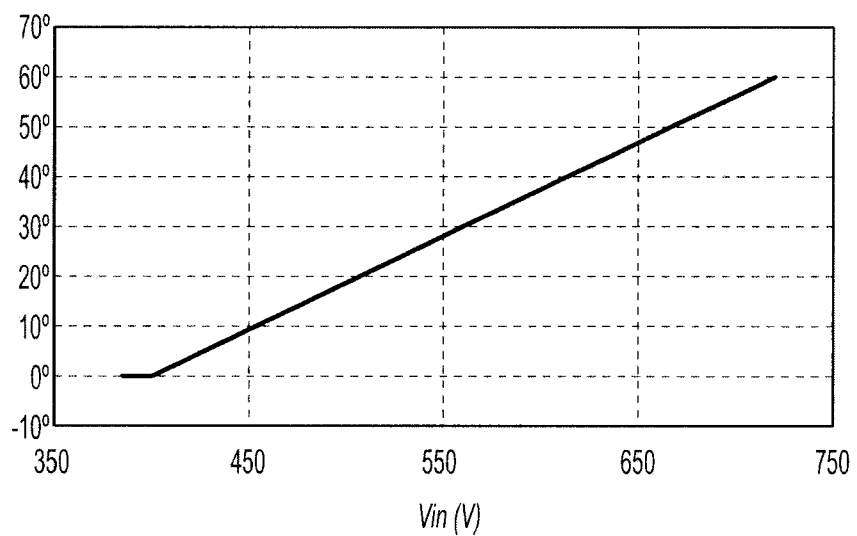
FIG. 9 is a diagram illustrating a rectifier phase-shift angle corresponding to a rectifier switching unit versus the input voltage.

Referring now to FIG. 9, a diagram illustrates a second phase-shift angle corresponding to the CR unit 104 versus the input voltage according to an exemplary embodiment. For the function shown in FIG. 9, the input voltage breakpoint=400V and $\phi2_{max}=60°$. It is appreciated, however, that other values may be selected. Also, other independent variables including, but not limited to, the resonant tank currents and output power, may be included in this function to more precisely define the region of ZVS of the primary converter unit 102. In addition, other function types including, but not limited to, polynomial functions and exponential functions, may be used instead of a piecewise linear one described above. An additional feedback loop may also be used to substitute or supplement the feed-forward described above to enable control of the second phase-shift angle $\phi 2$ with increased accuracy.

Figure 10:
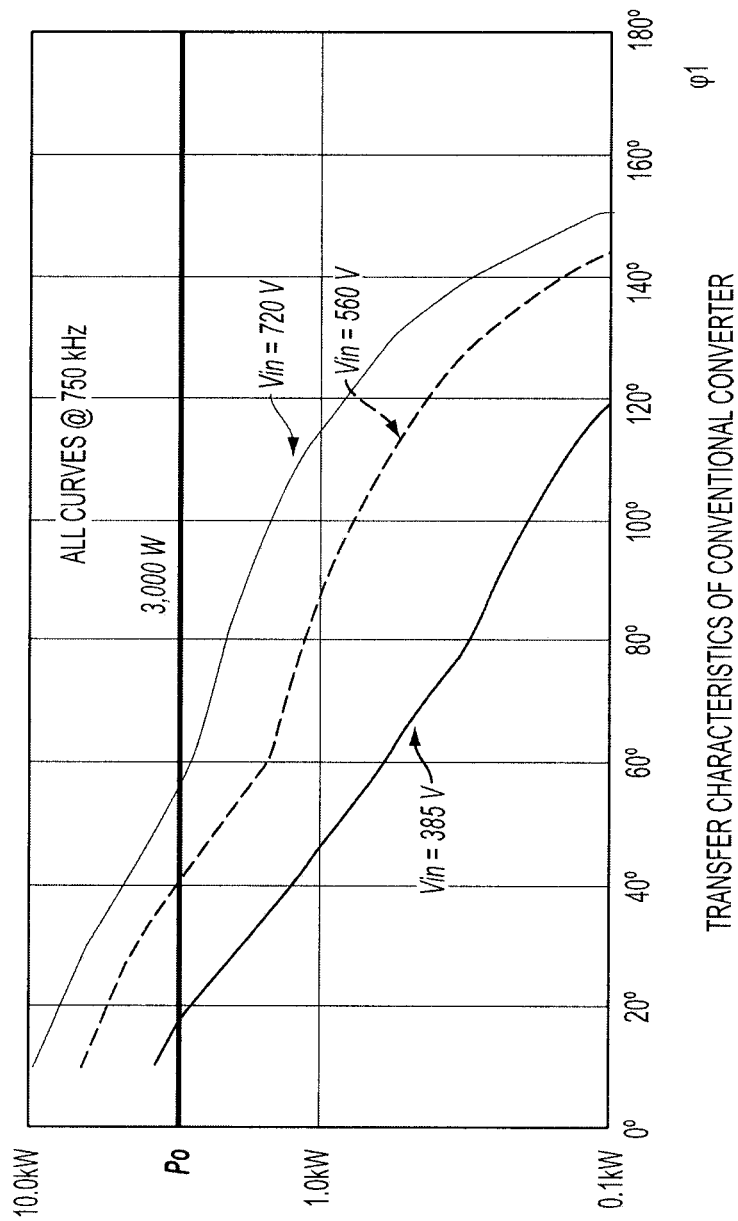
FIG. 10 is a diagram illustrating the circuit transfer characteristics of a conventional resonant converter over a full range of input voltages.

Referring to FIG. 10, a diagram illustrates circuit transfer characteristics of a conventional resonant converter over a full range of input voltages. More specifically, FIG. 10 illustrates three input voltages corresponding to the function of $\phi 1$ (Vin) over full operating ranges of a conventional resonant converter with $\phi 2$ fixed at 0°. As illustrated in FIG. 10, the conventional resonant converter operates efficiently only at the lowest input voltage (Vin=385 V). As the input voltage is increased, however, the conventional resonant converter draws in additional power that circulates in the series resonator converter unit. The added power returns to the input source, thereby generating energy losses.

Figure 11:
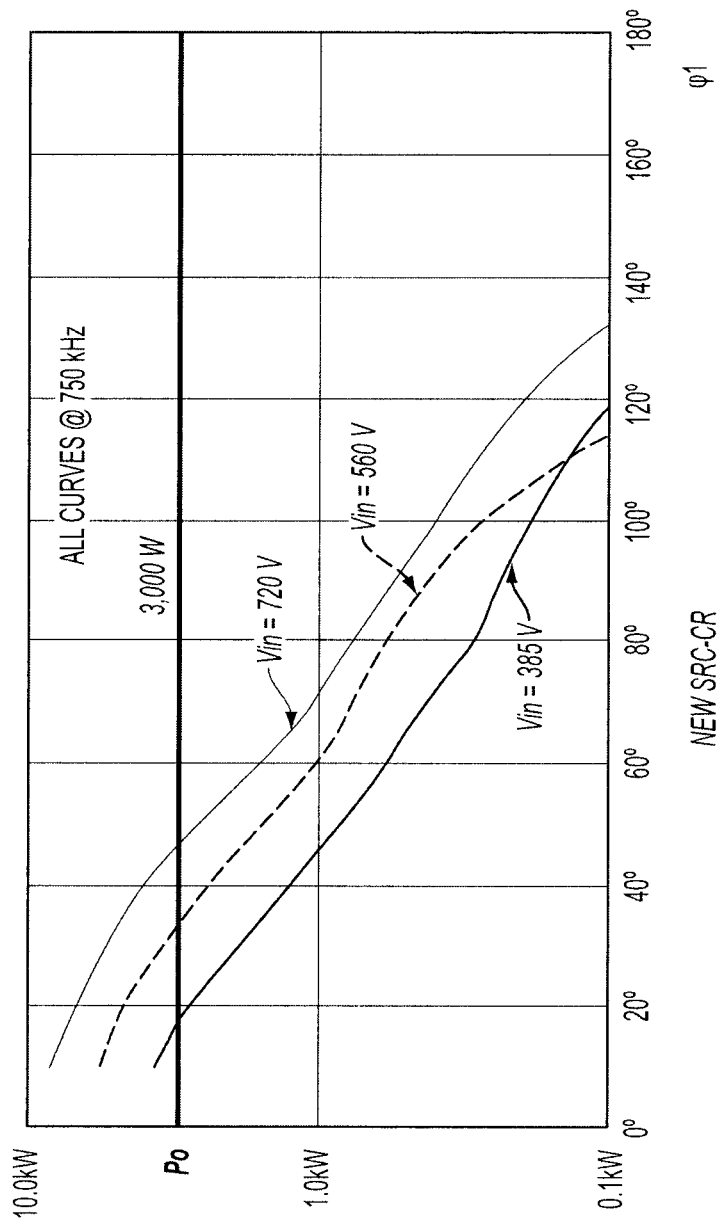
FIG. 11 is a diagram illustrating the circuit transfer characteristics over a full range of input voltages of a wide input DC/DC resonant converter system according to an embodiment of the disclosure.

Referring now to FIG. 11, a diagram illustrates the circuit transfer characteristics over a full range of input voltages of a wide input DC/DC resonant converter system 100 according to an exemplary embodiment of the disclosure. In contradistinction to the conventional resonant converter discussed above, the wide input DC/DC resonant converter system 100 significantly reduces excessive circulating power and improves efficiency at higher input voltages. That is, as the input voltage is increased, the CR 104 is controlled such that additional energy is inhibited from becoming stored in the resonant tank circuit 108, thereby improving the overall efficiency of the DC/DC resonant converter system 100 over a wide input voltage range.

Figure 12:
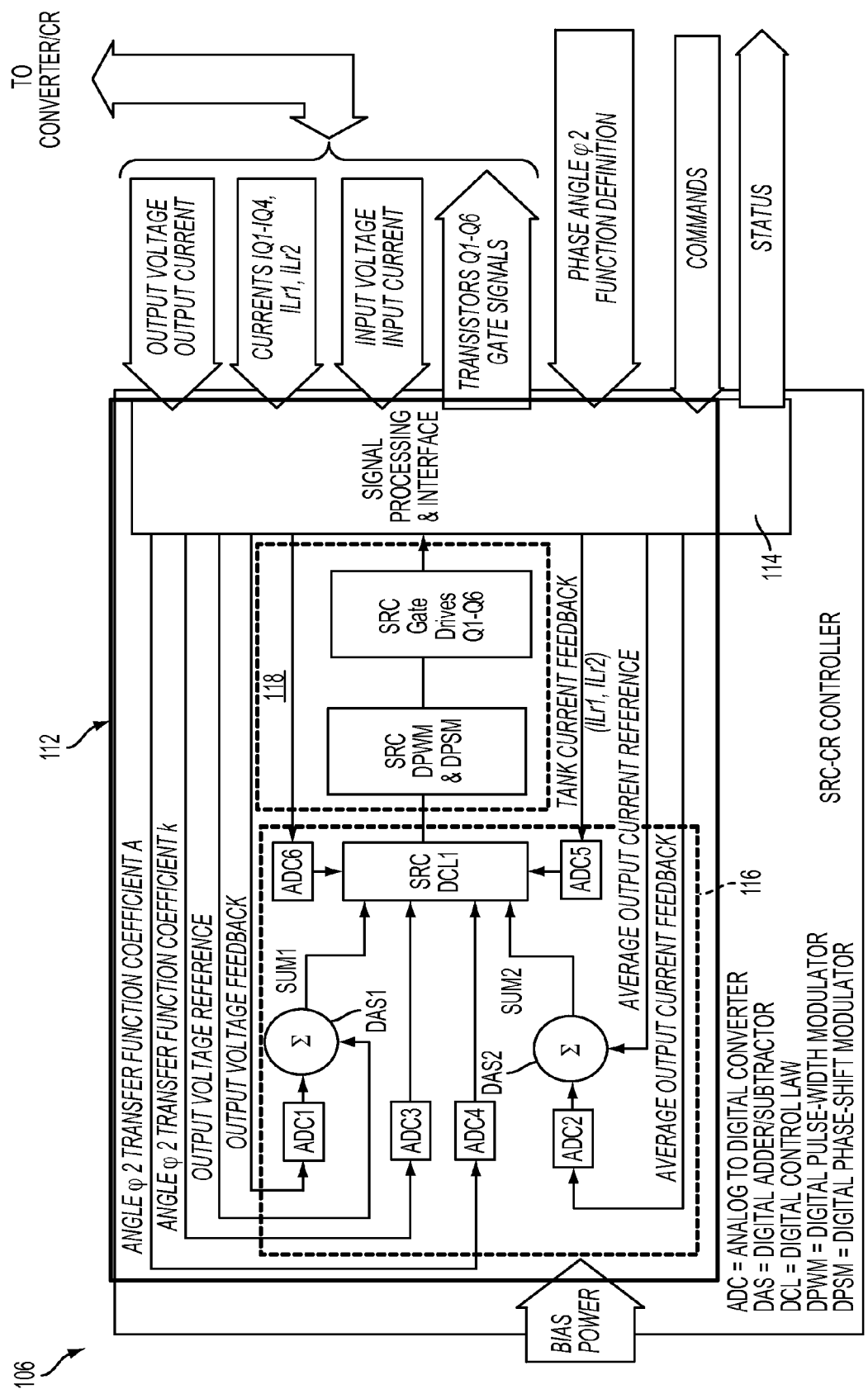
FIG. 12 is a block diagram illustrating a phase-shift controller to control a wide input DC/DC resonant converter according to an embodiment of the disclosure.

Referring now to FIG. 12, the phase-shift controller 106 is illustrated according to an exemplary embodiment. The phase-shift controller 106 may receive power from a bias power supply and may include a series resonant converter-controlled rectifier controller module 112 that determines the first and second phase-shift angles $\phi 1$, $\phi 2$. The series resonant converter-controlled rectifier controller module 112 may also generate one or more primary gate drive signals based on the first phase-shift angle $\phi 1$ to drive a respective primary FET (Q1-Q4), and may generate one or more rectifier drive signals based on the second phase-shift angle $\phi 2$ to drive a respective rectifier FET (Q5, Q6). A signal interface 114 may electrically communicate signals output from the phase-shift controller 106 to and/or from the primary converter unit 102 and/or the CR 104.

The converter-rectifier module 112 may comprise a phase-shift logic network 116 and a phase-shift signal generator 118. The phase-shift logic network 116 is configured to electronically calculate various parameters of the drive signal that drive the primary converter unit 102 and the CR 104. For example, the phase-shift logic network 116 may include a digital control law (DCL) that determines the duty ratio value of gate signals to drive the FETs Q1-Q6 based on reference voltage and current signals and/or feedback voltage and current signals. The phase-shift logic network 116 may further determine the first phase-shift angle and the second phase shift-angle.

The phase-shift signal generator 118 is configured to generate one or more converter control signals that drive the primary converter unit 102 and CR 104 and may be configured as a digital-to-analog (D/A) converter. The phase-shift signal generator 118 may include a digital pulse-width modulator and/or a digital phase-shift modulator to generate pulsed waveforms that control the FETs Q1-Q6 at the duty ratio and phase-shift angles determined by the phase-shift logic network 116. For example, the phase-shift signal generator 118 may generate a first pulse waveform that drives FETS Q1-Q4 at a duty cycle according to the first phase-shift angle $\phi 1$, and may generate a second pulse waveform that drives FETS Q5 and Q6 at a duty cycle according to the second phase-shift angle $\phi 2$. The phase-shift signal generator 118 is also configured to generate one or more rectifier control signals that drive the CR 104 according to the second phase-shift angle $\phi 2$.

More specifically, the converter-rectifier module 112 has one or more feedback loops from the output. The one or more feedback loops may include, but are not limited to, a voltage feedback signal and a current feedback signal. It is appreciated that other feedback loops, for example, an output power feedback loop and/or current fold-back may be added if desired. The main loops may include two average feedback signals. For example, the feedback signals may include, but are not limited to, an average output voltage (Vo) and an average output current (Io). An additional inner loop injects the resonant tank currents into the main loops to improve dynamic characteristics of the converter system 100. In addition to feedback signals, the phase-shift controller 106 receives second phase-shift angle $\phi 2$ function definition signals and data describing the overall converter characteristics of the converter system 100 (e.g., start-up time, output over-voltage protection, current and power limits, etc.). The phase-shift controller 106 may also receive commands from a higher-level control layer and output status signals. As described above, the phase-shift controller 106 may operate the converter system 100 such that the primary converter unit 102 realizes minimum reactive power, while inherently generating assistance currents to the primary FETs Q1-Q4 to achieve low-loss switching across a wide range of loads (i.e., light loads to full loads) and a wide range of input voltage. The phase-shift controller 106, therefore, may operate the 100 at a wide input voltage range and at high efficiency.

Figure 13:
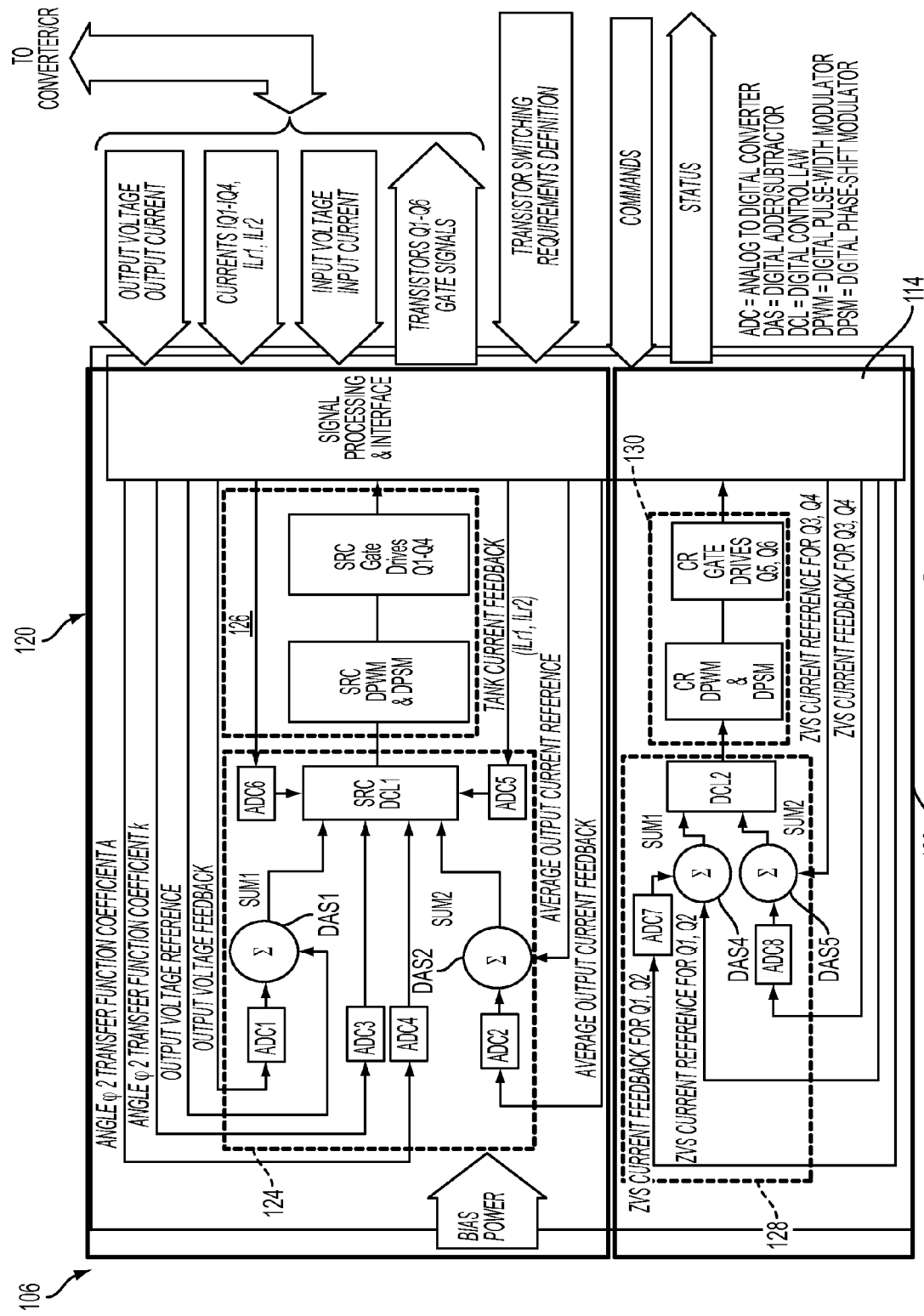
FIG. 13 is a block diagram illustrating a phase-shift controller to control a wide input DC/DC resonant converter according to another embodiment of the disclosure.

Referring to FIG. 13, a phase-shift controller 106 is illustrated according to another exemplary embodiment. The phase-shift controller 106 includes a converter control module 120 and a separate rectifier control module 122. The converter control module 120 includes a primary logic network 124 and a primary phase-shift signal generator 126. The primary logic network 124 determines the first phase-shift angle $\phi 1$, and the primary phase-shift signal generator 126 generates one or more primary gate drive signals based on the first phase-shift angle $\phi 1$ to drive a respective primary FET (Q1-Q4). The rectifier control module 122 includes a CR logic network 128 and a CR phase-shift signal generator 130. The CR logic network 128 determines the second phase-shift angle $\phi 2$, and the CR phase-shift signal generator 130 may generate one or more rectifier drive signals based on the second phase-shift angle $\phi 2$ to drive a respective rectifier FET (Q5, Q6).

More specifically, the phase-shift controller 106 illustrated in FIG. 13 includes two independent channels: a first dual-loop channel controlling the output, and a second ZVS control channel with two separate closed loops corresponding to a first set of primary FETs (Q1, Q2) and a second set of primary FETs (Q3, Q4). The second channel receives data describing the ZVS current reference, the minimum currents required for maintaining ZVS of the primary FETs Q1-Q4. The data may be provided, for example, by a higher level control layer. Different ZVS currents may be required by the two legs of the H-bridge circuit included with the primary converter unit 102.

Primary drive currents (IQ1-IQ4) are digitized by first and second analog-to-digital converters (ADC7 and ADC8) and subtracted from the ZVS current reference signals via a subtractor. The resultant signal is processed by a digital control law (DCL2). The control signal is input to the CR digital pulse width modulation (DPWM) and digital phase-shift modulation (DPSM) blocks to generate gate drive signals for the rectifier FETs Q5 and Q6. As described in detail above, the phase-shift controller 106 may receive data describing the overall converter characteristics of the converter system 100 (e.g. start-up time, output over-voltage protection, current and power limits, etc.) A signal interface 114 may also electrically communicate signals output from the phase-shift controller 106 to and/or from the primary converter unit 102 and/or the CR 104. Accordingly, the phase-shift controller may operate the converter system 100 with a relatively narrow input voltage range. In this embodiment, the phase-shift controller maximizes ZVS assistance currents and, as a byproduct, inherently reduces the reactive power realized by the primary converter unit 102. It is appreciated that embodiments of FIGS. 12 and 13 do not contradict each other because reducing reactive power and maintaining ZVS may be achieved using the same variable i.e., the second phase-shift angle $\phi 2$.

Figure 14:
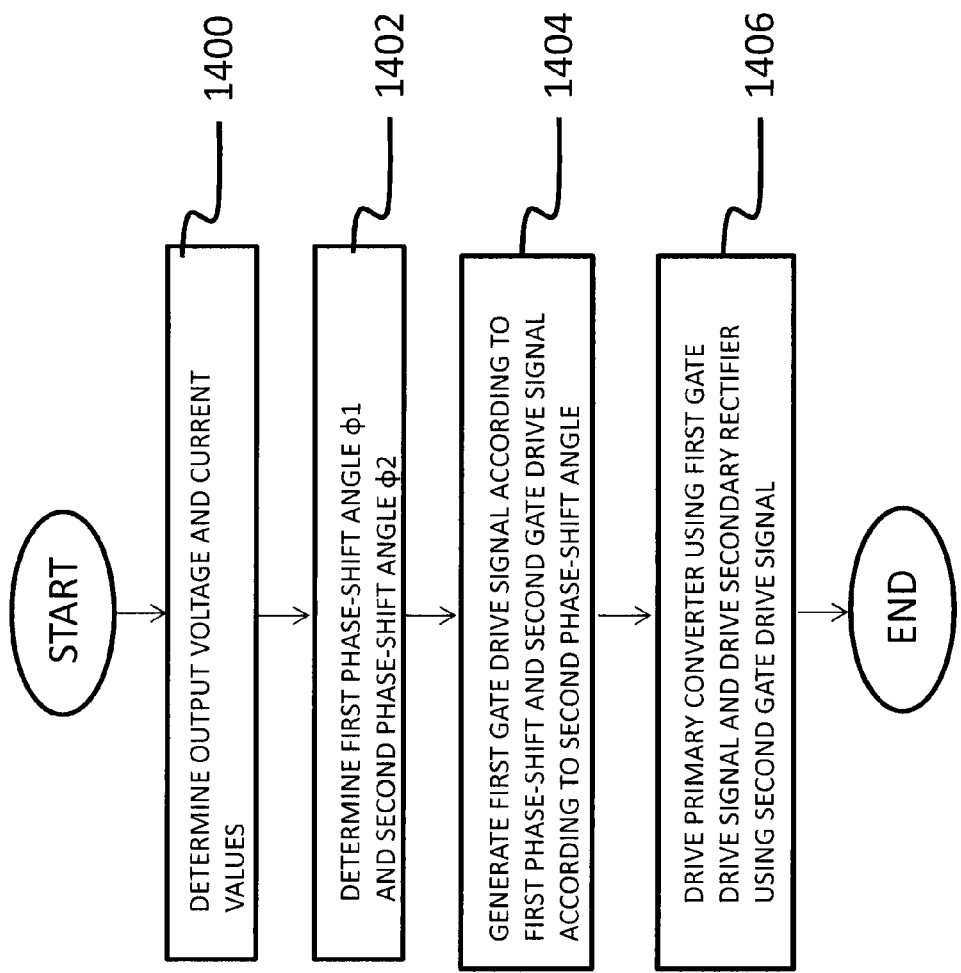
FIG. 14 is a flow diagram illustrating a method of operating a wide input DC/DC resonant converter system according to an embodiment of the disclosure.

Referring now to FIG. 14, a flow diagram illustrates a method of operating a wide input DC/DC resonant converter system according to an embodiment of the disclosure. At operation 1400, output voltage and current values of the wide input DC/DC resonant converter system are determined. It is appreciated that other values of the wide input DC/DC resonant converter system may be determined including, but not limited to, output power, phase-shift angle transfer function coefficients, resonant tank current values, average current values, average voltage values, zero voltage switching current reference values, and zero voltage switching feedback current values. At operation 1402, a first phase-shift angle $\phi 1$ and a second phase-shift angle $\phi 2$ are determined. At operation 1404, a first gate drive signal according to the first phase-shift angle $\phi 1$ is generated and a second gate drive signal according to the second phase-shift angle $\phi 2$ is generated. Accordingly, the switching elements of the secondary rectifier unit are lagged via the second phase-shift angle $\phi 2$. That is, the secondary rectifier unit is controlled to operate at a delay with respect to the primary converter unit using the second phase-shift angle. At operation 1406, a primary converter unit included in the wide input DC/DC resonant converter system is driven according to the first gate drive signal, and the method ends. According to one embodiment, for example, semiconductor switching elements, e.g., FETs, of the primary converter unit are switched according to the first phase-shift angle $\phi 1$. A secondary rectifier unit, i.e., a controlled rectifier, included in the wide input DC/DC resonant converter system is driven according to the second gate drive signal. Therefore, semiconductor switching elements of the controlled rectifier may be switched according to the second phase-shift angle $\phi 2$.

Figure 15:
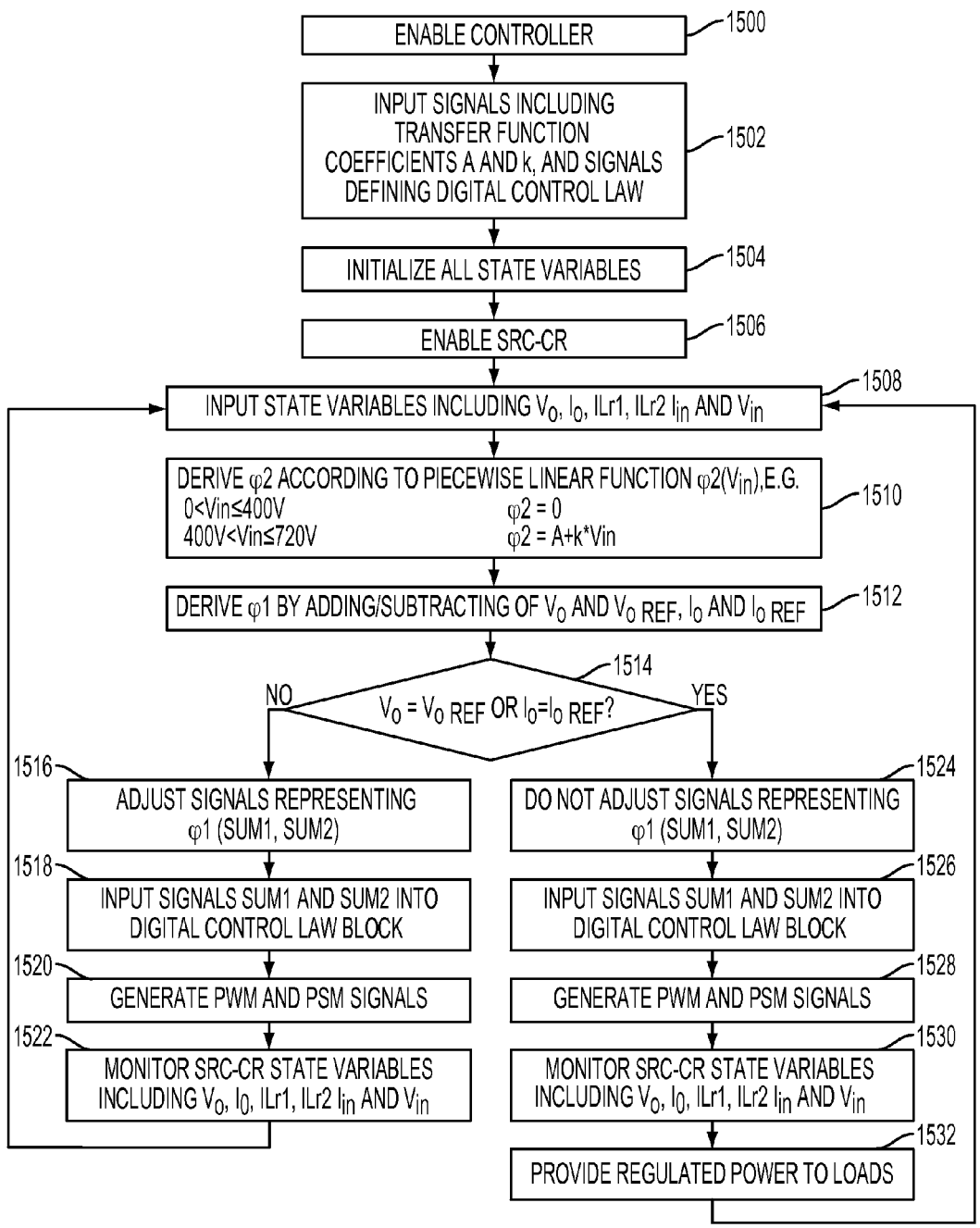
FIG. 15 is a flow diagram illustrating a method of regulating power to a load according to an exemplary embodiment.

Turning now to FIG. 15, a flow diagram illustrates a method of regulating power to a load according to an exemplary embodiment. At operation 1500, a controller for regulating power to the load is enabled. At operation 1502, input signals are generated. The input signals may include, but are not limited to, signals indicative of transfer function coefficients (A and k) and signals defining digital control law. At operation 1504, state variables are initialized. At operation 1506, the SRC-CR is enabled. At operation 1508, state variables are input to the controller. The state variables may include, but are not limited to, input voltage (Vin), output voltage (Vo), output current (Io), a first tank feedback current (ILr1) and a second tank feedback current (ILr2). At operation 1510, an initial phase-shift angle, for example, ($\phi 2$) is determined.

Turning to operation 1514, a determination is made whether to adjust the signals representing a related phase-shift angle, for example ($\phi 1$), based on a comparison between the Vo and Vref, or Io and Iref. If Vo or Io does not satisfy, (e.g., mismatches) the reference value, the signals representing $\phi 1$ are adjusted at operation 1516, and the adjusted signals are input to the controller at operation 1518. At operation 1520, the PWM and PSM signals are generated according to the adjusted $\phi 1$ input signals. Accordingly, the SRC-CR state variables are monitored at operation 1522, and method returns to operation 1508 where state variables are input to the controller.

Turning again to operation 1514, if Vo or Io satisfies, (e.g., matches) the reference value, then the signals representing $\phi 1$ are not adjusted at operation at operation 1524, and the non-adjusted signals are input to the digital control law block at operation 1526. Accordingly, PWM and PSM signals are generated at operation 1528. At operation 1530, the SRC-CR state variables are monitored, and the power is regulated to the loads accordingly at operation 1532. In at least one embodiment, the system may then return to operation 1508 to deal with any possible disturbances or changes in the input state variables.

Figure 16A:
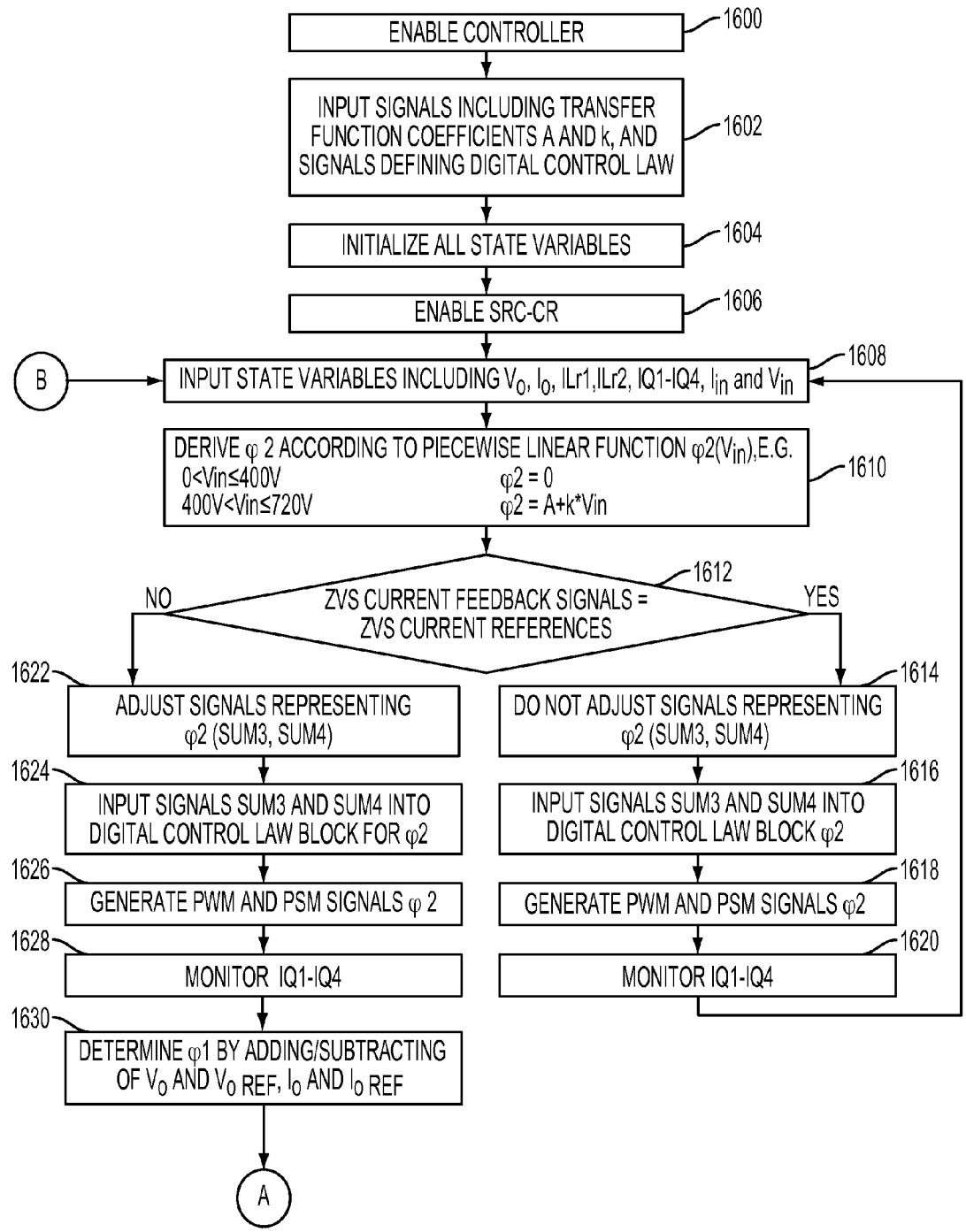
FIGS. 16A-16B, a flow diagram illustrating a method of regulating power to a load according to another exemplary embodiment.
Figure 16B:
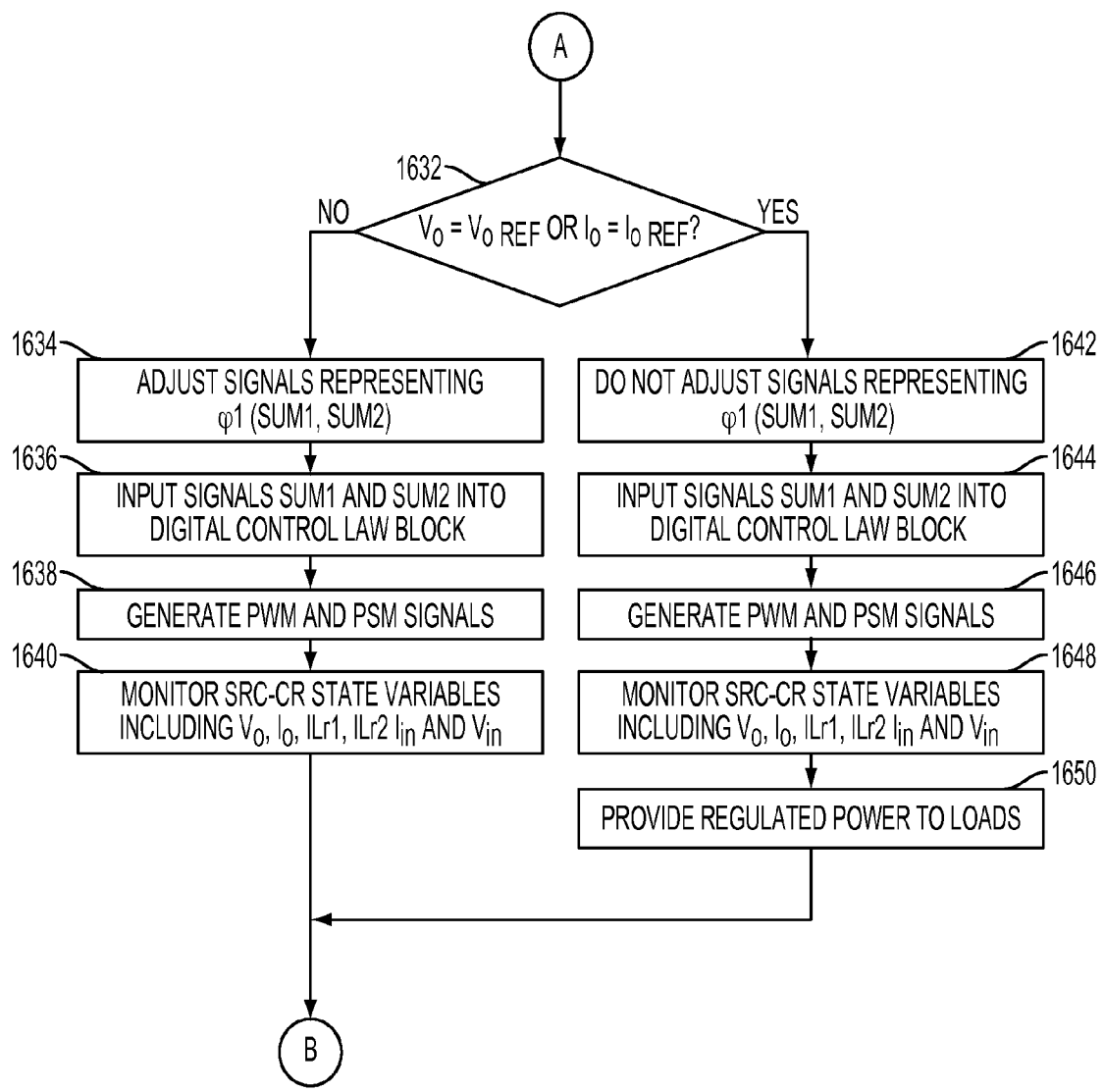

Referring now to FIGS. 16A-16B, a flow diagram illustrates another method of regulating power to a load according to an exemplary embodiment. At operation 1600, a controller for regulating power to the load is enabled. At operation 1602, input signals are generated. The input signals may include, but are not limited to, signals indicative of transfer function coefficients (A and k) and signals defining digital control law. At operation 1604, state variables are initialized, and the SRC-CR is enabled at operation 1606. At operation 1608, state variables are input to the controller. The state variables may include, but are not limited to, input voltage (Vin), output voltage (Vo), output current (Io), a first tank feedback current (ILr1), a second tank feedback current (ILr2), and primary drive currents IQ1-IQ4. At operation 1610, an initial phase-shift angle ($\phi 2$) is determined.

At operation 1612, the ZVS feedback current signals corresponding to Q1-Q4 are compared to the ZVS reference currents signals, respectively. If the ZVS feedback currents do satisfy (e.g., match) the ZVS reference current signals, the signals representing $\phi 2$ are not adjusted at operation 1614. At operation 1616, the non-adjusted signals are input to the controller as digital control law, and a PWM and PSM signals corresponding to $\phi 2$ are generated at operation 1618. At operation 1620, the primary drive currents IQ1-IQ4 are monitored, and the method returns to operation 1608 to input the state variables.

Turning again to operation 1612, if the ZVS feedback currents do not satisfy, (i.e., mismatch) the ZVS reference current signals, then the signals representing $\phi 2$ are adjusted at operation 1622. The adjusted signals are then input to the controller as digital control law at operation 1624. At operation 1626, the PWM and PSM signals corresponding to $\phi 2$ are generated, and the primary drive currents IQ1-IQ4 are monitored at operation 1628.

Turning now to operation 1630, a related phase-shift angle ($\phi 1$) is determined using the output voltage or the output current and a respective reference value. At operation 1632, a determination is made whether to adjust the signals representing $\phi 1$ based on a comparison between the Vo and Vref, or Io and Iref. If Vo or Io does not satisfy (e.g., mismatches) the reference value, the signals representing $\phi 1$ are adjusted at operation 1634, and the adjusted signals are input to the controller at operation 1636. At operation 1638, the PWM and PSM signals are generated according to the adjusted $\phi 1$ input signals. Accordingly, the SRC-CR state variables are monitored at operation 1640, and method returns to operation 1608 where state variables are input to the controller.

Turning again to operation 1632, if Vo or Io satisfies (e.g., matches) the reference value, then signals representing φ1 are not adjusted at operation at operation 1642, and the non-adjusted signals are input to the digital control law block at operation 1644. Accordingly, PWM and PSM signals are generated at operation 1646. At operation 1648, the SRC-CR state variables are monitored, and the power is regulated to the loads accordingly at operation 1650. In at least one embodiment, the system may then return to operation 1608 to deal with any possible disturbances or changes in the input state variables.

As will thus be appreciated, among the technical features discussed above, at least one embodiment of the inventive teachings provides a wide range DC/DC resonant converter system that reduces reactive power at high input voltage with dual-angle control of a primary convert and a secondary rectifier using first and second phase-shift angles, respectively. In addition, at least one embodiment provides a wide range DC/DC resonant converter system including a primary converter unit that operates using zero voltage switching (ZVS), and a secondary controlled rectifier that operates using zero current switching (ZCS). Further, at least one embodiment of the inventive teachings provides a wide range DC/DC resonant converter system that generates ZVS assistant currents of a primary converter unit using two independent closed loop channels such that reactive power at high input voltage may be automatically reduced.

While the disclosure has been described with reference to a preferred embodiment or embodiments, it will be understood by those skilled in the art that various changes may be made and equivalents may be substituted for elements thereof without departing from the scope of the disclosure. In addition, many modifications may be made to adapt a particular situation or material to the teachings of the disclosure without departing from the essential scope thereof. Therefore, it is intended that the disclosure not be limited to the particular embodiment disclosed as the best mode contemplated for carrying out this disclosure, but that the disclosure will include all embodiments falling within the scope of the appended claims.

What is claimed is:

1. A DC/DC resonant converter system, comprising:
    a primary converter unit including a resonant tank circuit, the primary converter unit further including a plurality of primary switching units that form a primary H-bridge circuit configured to regulate the current flowing into the resonant tank circuit, the primary H-bridge circuit including a first leg having first and second primary switching units, and a second leg having second and third primary switching units;
    a controlled secondary rectifier unit including a plurality of rectifier switching units to reduce reactive power in the primary converter unit, the secondary rectifier unit including controlled bridge having a third leg with a first unidirectional switching unit connected to a first bridge diode, and a fourth leg with a second unidirectional switching unit connected to a second bridge diode; and
    a phase-shift controller in electrical communication with the primary converter unit and the controlled secondary rectifier unit, the phase-shift controller configured to determine a rectifier phase-shift angle based on the plurality of primary switching units and to control switching of the plurality of rectifier switching units based on the rectifier phase-shift angle,
    wherein the controlled bridge further comprises:
        a transformer having a center-tap node, the transformer including a first end connected between the first unidirectional switching unit and the first bridge diode, and a second end connected between the second unidirectional switching unit and the second bridge diode; and
        a center-tap diode including an anode connected to the center-tap node of the transformer and a cathode connected in common with the first and second unidirectional switches.

2. The DC/DC resonant converter system of claim 1, wherein the primary converter unit is a series resonant converter, and the resonant tank circuit is a split resonant tank circuit including a capacitor interposed between a first primary winding and a second primary winding.

3. The DC/DC resonant converter system of claim 1, wherein the second leg of the primary H-bridge circuit is phase-shifted with respect to the first leg of primary switching units.

4. The DC/DC resonant converter system of claim 3, wherein the third leg of the controlled bridge is phase-shifted with respect to the third primary switching unit of the second leg of the primary H-bridge circuit, and the fourth leg of the controlled bridge is phase-shifted with respect to the fourth primary switching unit of the second leg of the primary H-bridge circuit.

5. The DC/DC resonant converter system of claim 4, wherein the phase-shift controller calculates a converter phase-shift angle that is applied to the second leg of primary switching units, and wherein the rectifier phase-shift angle is delayed with respect to the converter phase-shift angle.

6. The DC/DC resonant converter system of claim 5, wherein the phase-shift controller delays activating a first switch of the second leg with respect to a first switch of the first leg based on the converter phase-shift angle, and delays activating a second switch of the second leg with respect to a second switch of the first leg based on the converter phase-shift angle.

7. The DC/DC resonant converter system of claim 6, wherein the phase-shift controller delays activating a first switch of the plurality of rectifier switching units with respect to the first switch of the second leg based on the rectifier phase-shift angle, and delays activating a second switch of the plurality of rectifier switching units with respect to the second switch of the second leg based on the rectifier phase-shift angle.

8. A method of controlling a resonant power in a DC/DC converter, the method comprising:
    determining transfer coefficients of the DC/DC converter;
    determining an input voltage of the DC/DC converter;
    determining at least one of an output voltage and an output current of the DC/DC converter;
    generating an initial phase-shift angle based on the input voltage and the transfer coefficients, the initial phase-shift angle generating according to a linear feed-forward algorithm applied to the input voltage;
    generating a related phase-shift angle based on at least one of the output voltage and the output current, and a threshold value; and
    adjusting the related phase-shift angle based on a comparison between one of the output voltage and a reference voltage, or the output current and a reference current, wherein the comparison based on one of the output voltage mismatching the reference voltage, or the output current mismatching the reference current, and maintain the related phase-shift angle in response to one of the output voltage matching the reference voltage or the output current matching the reference current.

9. A method of controlling resonant power in a DC/DC converter, the method comprising:
   determining transfer coefficients of the DC/DC converter;
   determining an input voltage of the DC/DC converter;
   determining at least one of an output voltage and an output current of the DC/DC converter;
   generating an initial phase-shift angle of the resonant power in a DC/DC converter based on the input voltage and the transfer coefficients;
   determining a plurality of zero-voltage switching (ZVS) feedback currents of the resonant power in a DC/DC converter, and
   adjusting the initial phase shift angle based on a comparison between each ZVS feedback current to a respective ZVS reference current, wherein the comparison is based on to the ZVS feedback currents mismatching the respective ZVS reference currents, wherein
   the initial phase shift angle is maintained in response to the ZVS feedback currents matching the respective ZVS reference currents.

10. The method of claim 9, further comprising:
    generating a related phase-shift angle based on at least one of the output voltage and the output current, and a threshold value; and
    adjusting the related phase-shift angle based on a comparison between one of the output voltage and a reference voltage, or the output current and a reference current.

11. The method of claim 10, further comprising generating the initial phase-shift angle according to a linear feed-forward algorithm applied to the input voltage, and generating the related phase-shift angle according to a phase shift modulated algorithm applied to the input voltage.

12. The method of claim 11, further comprising adjusting the related phase-shift angle in response to one of the output voltage mismatching the reference voltage or the output current mismatching the reference current, and maintaining the related phase-shift angle in response to one of the output voltage matching the reference voltage or the output current matching the reference current.

* * * * *